United States Patent
Kaido et al.

[11] Patent Number: 5,938,869
[45] Date of Patent: Aug. 17, 1999

[54] PNEUMATIC TIRE WITH AIR PERMEATION PREVENTIVE LAYER

[75] Inventors: Hiroyuki Kaido; Kazuto Yamakawa; Jiro Watanabe, all of Hiratsuka, Japan

[73] Assignee: The Yokohama Rubber Co., Ltd., Tokyo, Japan

[21] Appl. No.: 08/737,880

[22] PCT Filed: Mar. 21, 1996

[86] PCT No.: PCT/JP96/00736

§ 371 Date: Feb. 11, 1997

§ 102(e) Date: Feb. 11, 1997

[87] PCT Pub. No.: WO96/30220

PCT Pub. Date: Oct. 3, 1996

[30] Foreign Application Priority Data

Mar. 24, 1995 [JP] Japan ................................. 7-066341
Aug. 11, 1995 [JP] Japan ................................. 7-205981
Dec. 14, 1995 [JP] Japan ................................. 7-325991

[51] Int. Cl.$^6$ ............................. B29D 30/06; B60C 1/00; B60C 5/14; B60C 9/02
[52] U.S. Cl. .......................... 152/510; 152/548; 156/134
[58] Field of Search .................... 152/510, 548; 156/123, 133, 218, 134, 157, 159, 304.1

[56] References Cited

U.S. PATENT DOCUMENTS 4,776,909 10/1988 Bohm et al. .................. 156/133 X
5,738,158 4/1998 Ozawa et al. ..................... 152/510

FOREIGN PATENT DOCUMENTS 2 299 978   9/1976  France .
40 30 474   4/1991  Germany ............................. 152/510
62-241943  10/1987  Japan .
4-11502     1/1992  Japan .
4-118302    4/1992  Japan .
4-183603    6/1992  Japan .
7-24928     1/1995  Japan .

OTHER PUBLICATIONS

Form PCT/ISA/210 for PCT/JP96/00736.

*Primary Examiner*—Adrienne C. Johnstone
*Attorney, Agent, or Firm*—Finnegan, Henderson, Farabow, Garrett & Dunner, L.L.P.

[57] ABSTRACT

A pneumatic tire has an air permeation preventive layer comprised of a film or sheet composed of a polymer composition containing a thermoplastic resin or a blend of a thermoplastic resin and an elastomer with an air permeation coefficient of not more than $25 \times 10^{-12}$ cc·cm/cm$^2$·sec·cmHg and a Young's modulus of 1 to 500 MPa and wherein the film or sheet is arranged so that at least one turn of the film or sheet in the tire circumferential direction is free from a join.

6 Claims, 5 Drawing Sheets

PNEUMATIC TIRE WITH AIR PERMEATION PREVENTIVE LAYER

TECHNICAL FIELD

The present invention relates to a pneumatic tire, more particularly it relates to a lightweight pneumatic tire having a structure which can be manufactured with a good productivity without detracting from the resistance to air leakage, uniformity, rolling resistance, durability, etc.

BACKGROUND ART

Reduction of fuel consumption is one of the major technical issues in automobiles. As one of the means for this issue, demands for reduction of the weight of pneumatic tires have been strongly increased. On the other hand, an inner liner layer or other air permeation preventive layer comprised of a halogenated butyl rubber or other rubber having a low air permeability is conventionally provided at the inner surface of the pneumatic tire to maintain a constant tire air pressure.

However, a halogenated butyl rubber has a large hysteresis loss, and therefore, after vulcanization of the tire, when rippling is caused in the rubber of the inner surface of the carcass layer and the inner liner layer, since the inner liner layer deforms along with deformation of the carcass layer, there is the problem of an increase of the rolling resistance. Therefore, in general, a rubber sheet called a "tie rubber" having a small hysteresis loss has been inserted between the inner liner layer (for example, halogenated butyl rubber) and rubber of the inner surface of the carcass layer when joining the two. Accordingly, in addition to the thickness of the inner liner layer of the halogenated butyl rubber, the thickness of the tie rubber is added and the layer overall becomes a thickness of over 1 mm (i.e., 1,000 $\mu$m). As a result, this has become a factor increasing the weight of the final tire.

Techniques have been proposed for using various materials in place of the butyl rubber or other low air permeability rubber as the inner liner layer of a pneumatic tire. For example, Japanese Examined Patent Publication (Kokoku) No. 47-31761 discloses to coat the inner surface of a vulcanized tire with, at a thickness of not more than 0.1 mm, a solution or dispersion of a synthetic resin such as a polyvinylidene chloride, saturated polyester resin, or polyamide resin having an air permeation coefficient [$cm^3$ (standard state)/cm·sec·mmHg] of not more than $10 \times 10^{-13}$ at 30° C. and not more than $50 \times 10^{-13}$ at 70° C.

Japanese Unexamined Patent Publication (Kokai) No. 5-330307 discloses to halogenate the inner surface of the tire (using a conventionally known chlorination solution, bromine solution, or iodine solution) and form, on the top thereof, a polymer film (the thickness=10 to 200 $\mu$m) of methoxymethylated nylon, copolymer nylon, a blend of polyurethane and polyvinylidene chloride, or a blend of polyurethane and polyvinylidene fluoride.

Further, Japanese Unexamined Patent Publication (Kokai) No. 5-318618 discloses a pneumatic tire using a thin film of methoxymethylated nylon as an inner liner. According to this technique, a solution or emulsion of methoxymethylated nylon is spread or coated on the inner surface of a green tire, then the tire is vulcanized or a solution or emulsion of methoxymethylated nylon is spread or coated on the inner surface of the tire after vulcanization so as to produce the pneumatic tire.

Further, Japanese Unexamined Patent Publication (Kokai) No. 6-40207 is an example of using as an air permeation preventive layer composed of a tire a multilayer film having a low air permeability layer comprised of a polyvinylidene chloride film or ethylene-vinyl alcohol copolymer film and an adhesive layer comprised of a polyolefin film, aliphatic polyamide film, or polyurethane film. In this example, it is proposed to laminate the low air permeability layer and the adhesive layer to form a thin film and to laminate that thin film on the inner surface of a green tire comprised of unvulcanized rubber so that the adhesive layer contacts the carcass layer, then vulcanize and mold the green tire so as to provide an air permeation preventive layer on the inside of the tire. By using this multilayer film as the air permeation preventive layer, it is possible to reduce the thickness of the air permeation preventive layer from the past and to reduce the weight of the tire without detracting from the retention of the air pressure. However, when forming an air permeation preventive layer such as the inner liner from such a thermoplastic multilayer film, if the bond at the connecting portion (i.e., splice portion) of the multilayer film becomes poor, the splice portion of the liner of the final product may end up opening. Further, since the elongation of the splice portion is small at the time of inflation in the process for molding the tire, the uniformity of the tire is decreased and there is the possibility of occurrence of vibration when the automobile is being driven or a decline in the high speed durability.

Japanese Unexamined Patent Publication (Kokai) No. 59-93344 discloses an apparatus for forming a tire by adhering a cylindrical member of an inner liner etc. to the inside of a green tire. According to this apparatus, the cylindrical inner liner (i.e., cylindrical member) is continuously extruded from an extruder, inserted into the green tire carried on the tire table, and made to adhere to the inside of the green tire by inflation of a bladder. However, if it is attempted to use this apparatus when using a thermoplastic film as the inner liner material, when extruding the cylindrical film continuously downward, since the thermoplasticity is large, the cylindrical shape will not be held or the precision of the thickness of the film will not be obtained and the problem will arise of difficulty in cutting the cylindrical member (that is, the cylindrical thermoplastic film) inserted into the green tire by a cutter.

As explained above, various materials have been proposed for making the inner liner layer of a pneumatic tire in place of butyl rubber, but none has yet been commercialized. In view of this situation, we previously proposed, as a new material for an air permeation preventive layer, a polymer composition containing a thermoplastic resin or a blend of a thermoplastic resin and elastomer having an air permeation coefficient of not more than $25 \times 10^{-2}$ cc·cm/$cm^2$·sec·cmHg and a Young's modulus of 1 to 500 MPa (for example, see specifications of Japanese Patent Application Nos. 7-150353, 7-28318, 7-28257, 7-26844, 7-28320, 7-11752, etc.)

Figure 1A:
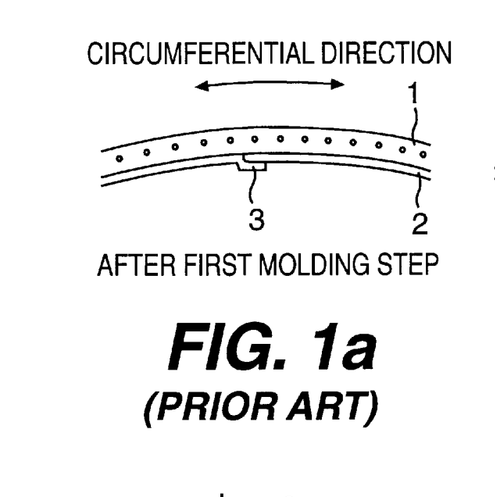
FIGS. 1(a) and 1(b) are views explaining the problem of splice opening of a film liner in the conventional molding of a tire.
Figure 1B:
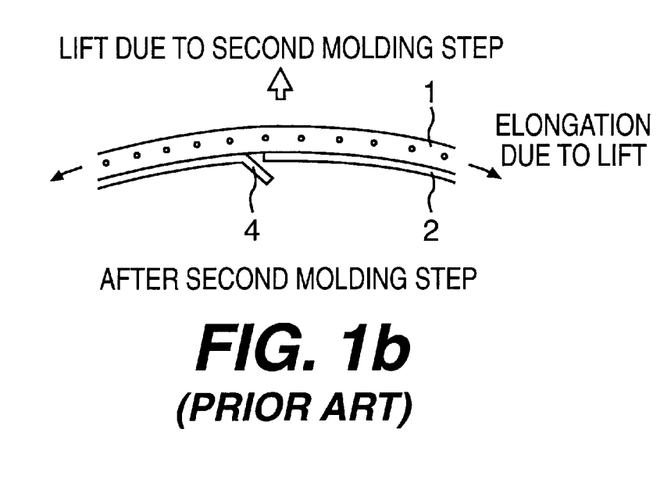

However, when fabricating an air permeation preventive layer, for example, as shown in FIGS. 1(a) and (b), in the case of the conventional butyl rubber liner, when moving from the first molding step to the second molding step at the time of processing, the lift caused in the second molding step shown in FIG. 1(b) causes the connecting portion 3 of the film liner 2 at the bottom of the carcass layer 1 to elongate, and therefore, makes the tack of the film liner smaller, and therefore, the splice portion of the film liner ends up opening up (i.e., splice opening 4).

Figure 2:
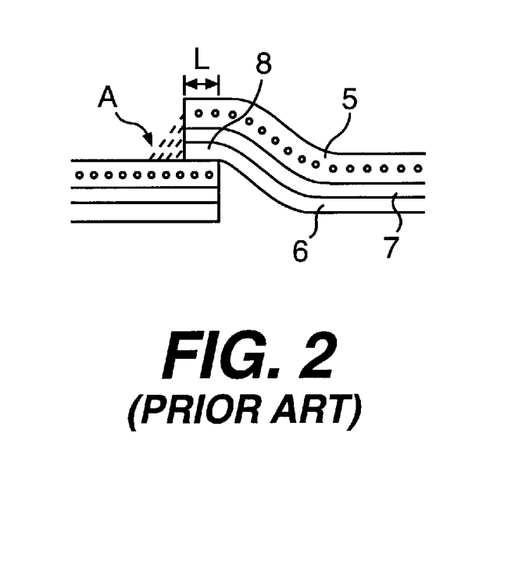
FIG. 2 is a conceptual sectional view of the phenomenon of an air deposit at a splice portion between the carcass and inner liner in a single-ply carcass structure of a conventional pneumatic tire.
Figure 3:
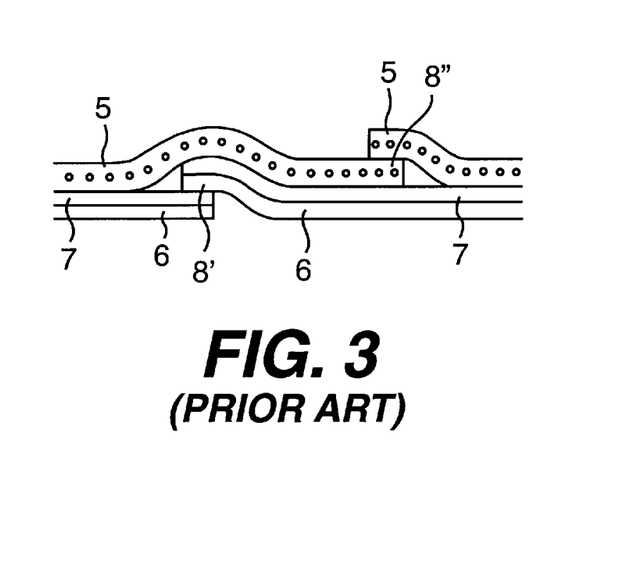
FIG. 3 is a sectional conceptual view of the typical structure of a splice portion of a carcass, inner liner, and tie rubber of a conventional single-ply carcass structure.

Further, as shown in FIG. 2, in a tire of a conventional single-ply carcass structure comprised of a carcass 5, inner liner layer (air permeation preventive layer) 6, and tie rubber 7, there is the problem of the occurrence of an air deposit A caused by the step difference of the splice portion (connecting portion) 8. To avoid this, the splice portion 8' of the inner liner layer 6/tie rubber 7 and splice portion 8" of the carcass 5 are offset in the circumferential direction as shown in FIG. 3 so as to keep the step difference of the splice portions small during the molding. However, with this molding method, there is a major problem in the productivity of the tire.

SUMMARY OF THE INVENTION

Accordingly, in view of the problems in the conventional pneumatic tires using a thermoplastic film for the air permeation preventive layer that, as explained above, when the bond of the connecting portion (i.e., splice portion) of the film in the tire manufacturing process is not sufficient, the connecting portion will open up at the time of inflation and cause a defective tire to be produced or that, since the elongation of the film connecting portion is smaller than other portions of the film, the air permeation preventive layer as a whole will not stretch uniformly at the time of inflation in the tire molding process and, therefore, problems will occur in the uniformity of the tire or the splicing work of the connecting portions of the film will become complicated, the object of the present invention is to solve the above problems and provide a pneumatic tire with a good work efficiency which enables a reduction of weight of the tire, has a uniform elongation of the air permeation preventive layer as a whole at the time of inflation without detracting from the retention of the air pressure in the tire, and further is free from the connecting portion opening at the time of molding the tire and causing the production of a defective tire as in the past.

In accordance with the present invention, there is provided a pneumatic tire comprising an air permeation preventive layer comprised of a film or sheet composed of a polymer composition containing a thermoplastic resin or a blend of a thermoplastic resin and an elastomer having an air permeation coefficient of not more than $25 \times 10^{-12}$ cc·cm/cm²·sec·cmHg and a Young's modulus of 1 to 500 MPa wherein the film or sheet is arranged in such a manner that at least one turn of the film or sheet in the tire circumferential direction is free from a join.

BRIEF DESCRIPTION OF THE DRAWINGS

The present invention will now be explained in further detail with reference to the drawings.

The configuration, mode of operation, and effects of the present invention will be explained in further detail below.

DETAILED DESCRIPTION OF THE INVENTION

As the air permeation preventive layer of the pneumatic tire according to the present invention, a film composed of a thermoplastic elastomer composition comprised of a thermoplastic resin or a thermoplastic resin and an elastomer component having a lower air permeability than the conventional butyl rubber is used. The film has an air permeation coefficient of not more than $25 \times 10^{-12}$ cc·cm/cm²·sec·cmHg, preferably not more than $5 \times 10^{-12}$ cc·cm/cm²·sec·cmHg, and a Young's modulus of 1 to 500 MPa, preferably 10 to 300 MPa. Further, the thickness of the film is preferably 0.02 to 0.2 mm, more preferably 0.05 to 0.2 mm. If the air permeation coefficient exceeds $25 \times 10^{-12}$ cc·cm/cm²·sec·cmHg, the air permeation preventive layer must be made thicker in order to hold the tire air pressure, and therefore, this is not preferred from the viewpoint of lightening the weight of the pneumatic tire. Further, if the Young's modulus is too low, the moldability is reduced due to the occurrence of wrinkles and elongation at the time of molding the tire, while conversely if too high, there are problems in the durability.

The thermoplastic resin may be made any material having an action preventing permeation of air. Examples of such a thermoplastic resin are the following thermoplastic resins and any polymer mixtures of these thermoplastic resin components or these thermoplastic resin components and elastomer components etc.

As the thermoplastic resin, polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/N66), nylon 6/66/610 copolymer (N6/66/610), nylon MXD (MXD6), nylon 6T, nylon 6/6T copolymer, nylon 66/PP copolymer, and nylon 66/PPS copolymer) and N-alkoxyalkylates of these, for example, methoxymethylates of 6-nylon, methoxymethylates of 6-610-nylon, and methoxymethylates of 612-nylon, polyester resins (for example, polybutylene terephthalate (PBT), polyethylene terephthalate (PET), polyethylene isophthalate (PEI), PET/PEI copolymers, polyacrylate (PAR), polybutylene naphthalate (PBN), liquid crystal polyester, polyoxyalkylene diimid diacid/ polybutyrate terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymers, methacrylonitrile/styrene/butadiene copolymers, polymethacrylate resins (for example, polymethyl methacrylate (PMMA), polyethyl methacrylate), polyvinyl resins (for example, vinyl acetate, polyvinyl alcohol (PVA), vinyl alcohol/ethylene copolymer (EVOH), polyvinylidene chloride (PDVC), polyvinyl chloride (PVC), polyvinyl/polyvinylidene chloride copolymer, polyvinylidene chloride/methyl acrylate copolymer, vinylidene chloride/acrylonitrile copolymer), cellulose resins (for example, cellulose acetate, cellulose acetobutyrate), fluororesins (for example, polyvinylidene fluoride (PVDF), polyvinyl fluoride (PVF), polychlorofluoroethylene (PCTFE), tetrafluoroethylene/ethylene copolymer), imide resins (for example, aromatic polyimides (PI)), etc. may be exemplified.

The elastomer component which may be blended with the above thermoplastic resin is not particularly limited in type or amount so long as it forms a composition in the state blended with the thermoplastic resin component which, as a result, has the above air permeation coefficient and Young's modulus. Examples of such an elastomer are as follows.

Diene rubbers and the hydrogenated products thereof (for example, NR, IR, epoxylated natural rubber, SBR, BR (high cis-BR and low-cis BR), NBR, hydrogenated NBR, hydrogenated SBR), olefin rubbers (for example, ethylene propylene rubber (EPDM, EPM), maleic acid-modified ethylene propylene rubber (M-EPM), IIR, isobutylene and aromatic vinyl or diene monomer copolymers, acryl rubbers (ACM), ionomers), halogenated rubbers (for example, Br-IIR, Cl-IIR, bromide of isobutylene paramethylstyrene copolymer (Br-IPMS), CR, chlorohydrin rubber (CHR), chlorosulfonated polyethylene (CSM), chlorinated polyethylene (CM), maleic acid-modified chlorinated polyethylene (M-CM), silicone rubbers (for example, methylvinyl silicone rubber, dimethyl silicone rubber, methylphenylvinyl silicone rubber), sulfur-containing rubber (for example, polysulfide rubber), fluororubber (for example, vinylidene fluoride rubber, fluorine-containing vinylether rubber, tetrafluoroethylene propylene rubber, fluorine-containing silicone rubber, fluorine-containing phosphazen rubber), thermoplastic elastomers (for example, styrene elastomers, olefin elastomers, ester elastomers, urethane elastomers, polyamide elastomers), etc. may be exemplified.

The method for producing the thermoplastic elastomer composition constituting the air permeation preventive layer in the present invention consists of melting and kneading the thermoplastic resin component and elastomer component (in the case of rubber, the unvulcanized rubber) in advance by a biaxial kneader/extruder etc. to disperse the elastomer component in the thermoplastic resin forming the continuous phase. When vulcanizing the elastomer component, a vulcanization agent is added, while kneading, and the elastomer component is dynamically vulcanized. Further, the various compounding agents (except vulcanization agent) for the thermoplastic resin or elastomer component may be added during the above kneading, but preferably are mixed in advance before the kneading. The kneader used for kneading the thermoplastic resin and the elastomer component is not particularly limited. Examples thereof are a screw extruder, kneader, Banbury mixer, biaxial kneader/extruder, etc. Among these, it is preferable to use a biaxial kneader/extruder for the kneading of the thermoplastic resin and the elastomer and the dynamic vulcanization of the elastomer component. Further, two or more types of kneaders may be used for successive kneading. As the conditions for the melting and kneading, the temperature should be at least the temperature where the thermoplastic resin melts. Further, the shear rate at the time of kneading is preferably 1000 to 7500 $sec^{-1}$. The time for the overall kneading is from 30 seconds to 10 minutes. Further, when adding a vulcanization agent, the vulcanization time after addition is preferably 15 seconds to 5 minutes. The polymer composition produced by the above method is then extruded or calendered into a film. The method of forming the film may be a usual method of forming a film from a thermoplastic resin or thermoplastic elastomer.

The thin film obtained in this way takes the structure of a matrix of the thermoplastic resin (A) into which the elastomer component (B) is dispersed as a discontinuous phase. By adopting such a state of dispersion, it is possible to impart a balance of pliability and resistance to air permeation and further possible to obtain the effect of improvement of the resistance to heat deformation, improvement of the waterproofness, etc. Also, thermoplastic processing becomes possible. Therefore, it becomes possible to form a film by an ordinary plastic molding machine, that is, by extrusion molding or calendering. The method for forming a film may be any method usable for forming a film from an ordinary thermoplastic resin or thermoplastic elastomer. Further, the bonding between the film and the opposing rubber layer may be achieved by using a usual chlorinated rubber, phenolic resin, or isocyanate adhesive and using the heat and pressure at the time of vulcanization and molding. These adhesives may be, for example, a phenolic resin (Chemlock 220), chlorinated rubber (Chemlock 205), isocyanate (Chemlock 402), etc.

When the compatibilities of specific thermoplastic resins and elastomer components differ, it is possible to make the both components compatible using a suitable compatibilizer as a third component. By mixing a compatibilizer into the system, the surface tension of the thermoplastic resin and elastomer component falls and as a result the size of the rubber particles forming the dispersion layer become finer, and therefore, the characteristics of the two components becomes more effectively expressed. As such a compatibilizer, in general it is possible to adopt the structure of a copolymer having the structure of both or either of the thermoplastic resin and elastomer component or a copolymer having an epoxy group, carbonyl group, halogen group, amine group, oxazoline group, hydroxy group, etc. able to react with the thermoplastic resin or elastomer component. These may be selected depending upon the type of the thermoplastic resin and elastomer component to be mixed, but examples of the usually used ones are styrene/ethylene-butylene block copolymers (SEBS) and their maleic acid-modified products, EPDM, EPM, EPDM/styrene or EPDM/acrylonitrile graph copolymers and their maleic acid-modified products, styrene/maleate copolymers, reactive phenoxine, etc. The amount of the compatibilizer blended in is not particularly limited, but preferably is 0.5 to 10 parts by weight per 100 parts by weight of the polymer components (total of thermoplastic resin and elastomer components).

The ratio of the specific thermoplastic resin (A) and elastomer component (B) in the case of blending a thermoplastic resin and elastomer is not particularly limited, but may be suitably decided by the balance of the thickness of the film, resistance to air permeation, and pliability, but the preferable range is an (A)/(B) of 10/90 to 90/10, more preferably 10/80 to 85/15.

The polymer composition according to the present invention may have mixed in it, in addition to the above necessary polymer components, a compatibilizer polymer or other polymer to an extent not detracting from the necessary properties of the polymer composition for a tire according to the present invention. The purpose of mixing in other polymers may be to improve the compatibility of the thermoplastic resin and elastomer component, to improve the film-forming ability of the material, to improve the heat resistance, and to reduce costs. As materials used for this, for example, polyethylene (PE), polypropylene (PP), polystyrene (PS), ABS, SBS, polycarbonate (PC), etc. may be exemplified. The polymer composition according to the present invention may further include any agents generally mixed into a polymer formulation such as fillers (calcium carbonate, titanium oxide, alumina, etc.), carbon black, white carbon, and other reinforcers, softeners, plasticizers, processing adjuvants, pigments, dyes, antioxidants and vulcanization agents (cross-linking agents), vulcanization adjuvants (cross-linking adjuvants), etc. so long as not detracting from the above requirements of the air permeation coefficient and the Young's modulus.

The vulcanization agent, vulcanization adjuvant, vulcanization conditions (temperature, time), etc. in the case of dynamic vulcanization may be suitably determined depending upon the composition of the elastomer component added and are not particularly limited.

Examples of the vulcanization agent are a conventional rubber vulcanization agent (or cross-linking agent). Specifically, examples of a sulfur type vulcanization agent are powdered sulfur, precipitated sulfur, high dispersion sulfur, surface treated sulfur, insoluble sulfur, dimorpholine disulfide, alkylphenol disulfide, etc. For example, about 0.5 to 4 phr (parts by weight per 100 parts by weight of rubber component (or polymer)) may be used.

Further, examples of a vulcanization agent of the organic peroxide type are benzoyl peroxide, t-butylhydroperoxide, 2,4-dichlorobenzoyl peroxide, 2,5-dimethyl-2,5-di(t-butylperoxy)hexane, 2,5-dimethylhexane-2,5-di(peroxybenzoate), etc. For example, 1 to 15 phr or so may be used.

Further, examples of a vulcanization agent of the phenolic resin type are a bromide of an alkylphenol resin or a mixed cross-linking agent containing tin chloride, chloroprene, or other halogen donor and an alkylphenol resin. For example, 1 to 20 phr or so may be used.

In addition, zinc white (5 phr or so), magnesium oxide (4 phr or so), litharge (10 to 20 phr or so), p-quinone dioxime, p-dibenzoylquinone dioxime, tetrachloro-p-benzoquinone, poly-p-dinitrosobenzene (2 to 10 phr or so), and methylene dianiline (0.2 to 10 phr or so) may be used.

Further, a vulcanization accelerator may be optionally added. As a vulcanization accelerator, use may be made of aldehyde ammonia types, guanidine types, thiazole types, sulfenamide types, thiuram types, dithio carbonate types, thiourea types, and other general vulcanization accelerators in amounts of for example 0.5 to 2 phr.

Specifically, as an aldehyde ammonia type vulcanization accelerator, hexamethylene tetramine etc.;

as a guanidine type vulcanization accelerator, diphenyl guanidine etc.;

as a thiazole type vulcanization accelerator, dibenzothiazyldisulfide (DM), 2-mercaptobenzothiazole and its Zn salt, cyclohexylamine salt, etc.;

as a sulfenamide type vulcanization accelerator, cyclohexylbenzothiazylsulfenamide (CBS), N-oxydiethylenebenzothiazyl-2-sulfenamide, N-t-butyl-2-benzothiazolesulfenamide, 2-(thymolpolynyldithio)benzothiazole, etc.;

as a thiuram type vulcanization accelerator, tetramethylthiuram disulfide (TMTD), tetraethylthiuram disulfide, tetramethylthiuram monosulfide (TMTM), dipentamethylenethiuram tetrasulfide, etc.;

as a dithio acid salt type vulcanization accelerator, a Zn-dimethyldithiocarbamate, Zn-diethyldithiocarbamate, Zn-di-n-butylthiocarbamate, Zn-ethylphenyldithiocarbamate, Te-diethyldithiocarbamate, Cu-dimethyldithiocarbamate, Fe-dimethyldithiocarbamate, pipecolinepipecolyldithiocarbamate, etc.; and as a thiourea type vulcanization accelerator, ethylene thiourea, diethyl thiourea, etc. have been disclosed.

Further, examples of a vulcanization acceleration adjuvant are a general rubber adjuvant together. For example, zinc white (5 phr or so), stearic acid or oleic acid and Zn salts of the same (2 to 4 phr or so), etc. may be used.

The pneumatic tire according to a first aspect of the present invention and the method of production of the same will now be explained in further detail.

The air permeation preventive layer of the pneumatic tire according to the present invention may be arranged at any position inside the tire, that is, at the inside or outside of the carcass layer or at another position. The point is that the object of the present invention be achieved by arranging it so as to prevent the permeation and diffusion of air from the inside of the tire and enable the long term retention of the air pressure inside the tire.

Figure 4:
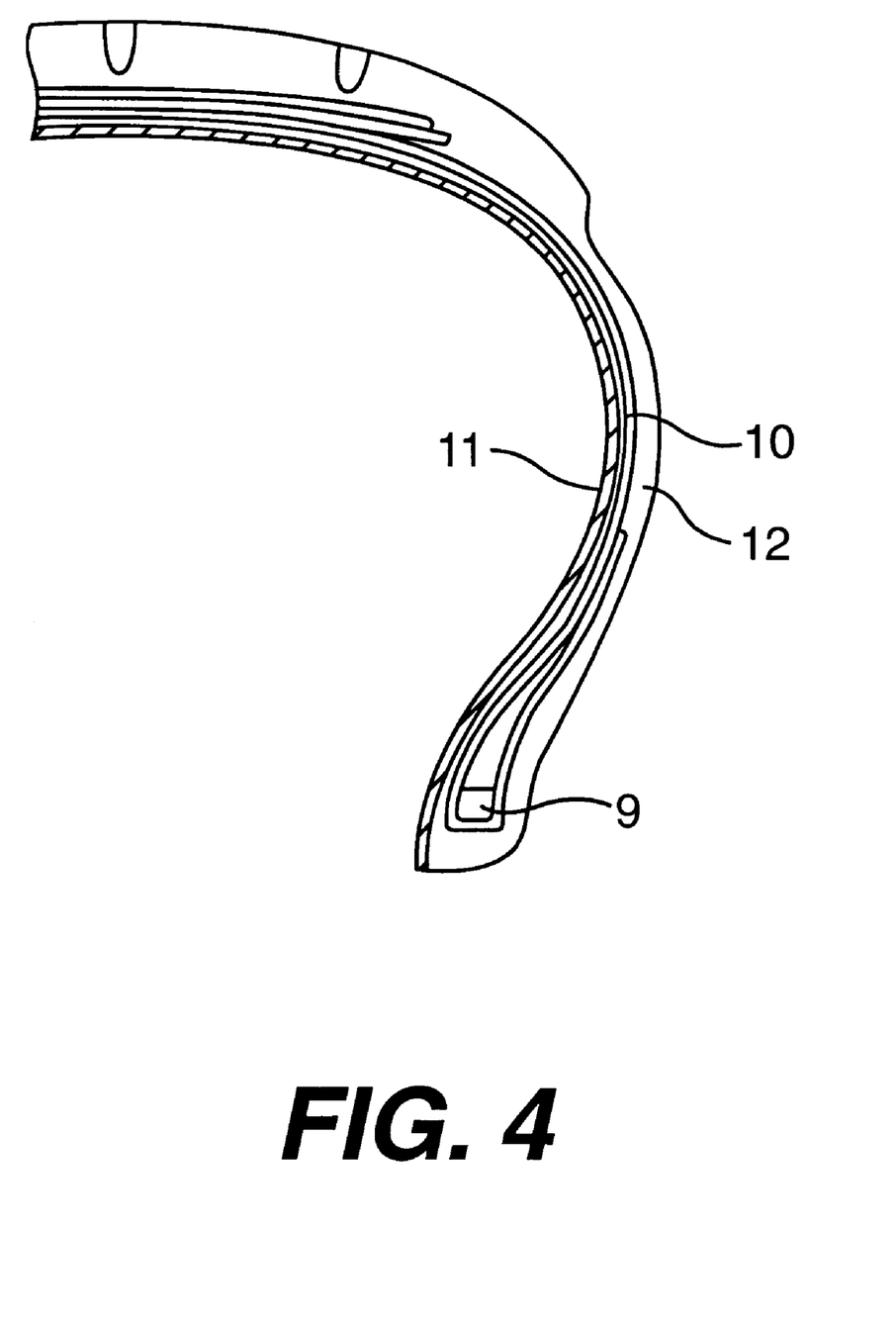
FIG. 4 is a semi-sectional view in the meridial direction of the construction of an inner liner portion of a pneumatic tire of the present invention.

FIG. 4 is a semi-sectional view in the meridial direction showing a typical example of the arrangement of the air permeation preventive layer of the pneumatic tire. In FIG. 4, a carcass layer 10 bridges a pair of left and right bead cores 9, 9. The air permeation preventive layer 11 is provided at the inner surface of the tire at the inside of the carcass layer 10. This air permeation preventive layer 11 is comprised of a cylindrical thermoplastic film in the first aspect of the present invention. In FIG. 4, 12 denotes a side wall.

Explaining the method of manufacturing a pneumatic tire having an air permeation preventive layer comprised of a cylindrical thermoplastic film according to the first aspect of the present invention taking as an example the case of arranging the air permeation preventive layer 11 at the inside of the carcass layer 10 as shown in FIG. 4, either one or more types of a thermoplastic resin having an action of preventing air permeation are fabricated into a single or multiple layers of cylindrical thermoplastic film by conventional extrusion, for example, inflation molding.

Next, the extruded single or multiple layers of cylindrical thermoplastic film are fit over the drum for molding the tire at the time of molding the green tire by cutting and supplying the necessary amount on the drum. This cylindrical thermoplastic film may be wound up once on a roll etc. and supplied on the molding drum at the time of molding the green tire.

Note that, instead of extruding the film into a cylinder, it is also possible to join the ends of strips of film and fuse them to make a cylindrical film.

On the cylindrical thermoplastic film fit over the molding drum are laid the carcass, sides, belt, tread, and rest of the tire members. This laminate is inflated as usual to produce the green tire which can then be vulcanized and made integral to produce a pneumatic tire.

The material of the rubber layer to which the air permeation preventive layer is laminated according to the present invention is not particularly limited. Any rubber material which has been generally used in the past as a rubber material for tires may be used. Examples of such a rubber, are a rubber composition comprising NR, IR, BR, SBR, or another diene rubber, a halogenated butyl rubber, an ethylene-propylene copolymer rubber, a styrene elastomer, etc. to which carbon black, process oil, vulcanizers, and other additives have been added.

The cylindrical thermoplastic resin film of the present invention used may be a single layer or may be a multiple layer film obtained by providing a polyolefin, aliphatic polyamide, or urethane type resin adhesive layer on the two surfaces of the film of the above air permeation preventive resin as described in Japanese Unexamined Patent Publication (Kokai) No. 6-40207 mentioned above or further may be a film obtained by dispersing into a matrix of another thermoplastic resin a flat oriented polymer comprised of a single non-air permeable thermoplastic resin produced by extruding and drawing a blend of at least two types of incompatible thermoplastic resins as described in Japanese Patent Application No. 7-55929 filed Mar. 15, 1995 by the same applicant.

Further, it is possible to include any elastomer component to keep these thermoplastic resins pliable and to use as a film the blend of Japanese Patent Application No. 7-8394 filed on Jan. 23, 1995 by the same applicant which uses the elastomer component as the domain and the resin layer as the matrix.

In the present invention, by using a single or multiple layer cylindrical film formed by inflation etc., as mentioned above, it is possible to prevent the tire from elongating nonuniformly at the time of inflation and deteriorating in uniformity since the difference in modulus between the splice portions (in the end the film becomes double layered) and other portions becomes large due to the presence of the splice portions (portions where film is joined). Looking at the difference in modulus, in the case of, for example, a butyl rubber liner, the difference between the splice portions (Young's modulus of about 10 MPa) and the nonsplice portions (Young's modulus of about 5 MPa/cm$^2$) is a relatively small 5 MPa, but, for example, in the case of a resin film of a blend of nylon 6 resin and olefinic resin (weight ratio of 60/40), the difference between the splice portions (about 400 MPa) and the nonsplice portions (about 200 MPa) is 200 MPa.

Further, when using a cylindrical film as the air permeation preventive layer, as in the present invention, the film is just fit over the molding drum when molding the tire, and therefore, the work is extremely easy, while wrapping the film and adhering the connecting portions as in the past is poor in work efficiency and further there is the chance of a problem occurring of poor connection. Alternatively, if wrinkles occur in the splice portions, air will leak out through them and the desired goal will not be able to be achieved.

According to the second aspect of the present invention, there is provided a pneumatic tire having a plurality of air permeation preventive layers covering the inner surface of the tire substantially in the circumferential direction of the tire continuously at least two turns and each comprised of a film of a polymer composition containing a thermoplastic resin or a blend of a thermoplastic resin and elastomer having an air permeation coefficient of not more than $25 \times 10^{-12}$ cc·cm/cm$^2$·sec·cmHg and a Young's modulus of 1 to 500 MPa.

According to the second aspect of the present invention, further, there is provided a pneumatic tire having a plurality of air permeation preventive layers substantially covering the inner surface of the tire and each comprised of a film of a polymer composition containing a thermoplastic resin or a blend of a thermoplastic resin and elastomer having an air permeation coefficient of not more than $25 \times 10^{-12}$ cc·cm/cm$^2$·sec·cmHg and a Young's modulus of 1 to 500 MPa and arranged in such a manner that the splice portions of the film do not coincide at the same location on the circumference of the tire.

Figure 5A:
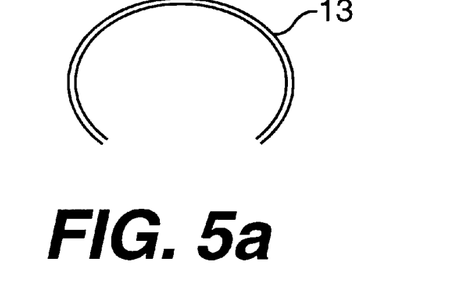
FIGS. 5a–5d are views of the arrangement of the polymer film of the air permeation preventive layer according to the present invention at a tire section and sides and shows in FIGS. 5a, 5b, 5c, and 5d several states of the same.
Figure 5B:
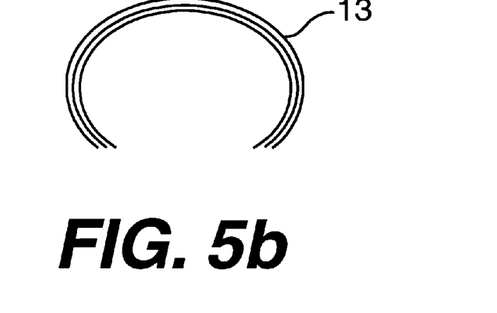

According to the second aspect of the present invention, as shown in FIGS. 5a–5d, the method of arrangement of the polymer film 13, covering the inner surface of the tire substantially in the circumferential direction of the tire continuously at least two turns and comprised of a film of a polymer composition containing a thermoplastic resin or a blend of a thermoplastic resin and elastomer with an air permeation coefficient of not more than $25 \times 10^{-12}$ cc·cm/cm$^2$·sec·cmHg and a Young's modulus of 1 to 500 MPa, is not particularly limited. An endless number may be considered. For example, as shown in FIG. 5a (sectional view) and FIG. 5b (sectional view), there are overall at least two polymer films 13 at the inner circumference of the tire.

Figure 5C:
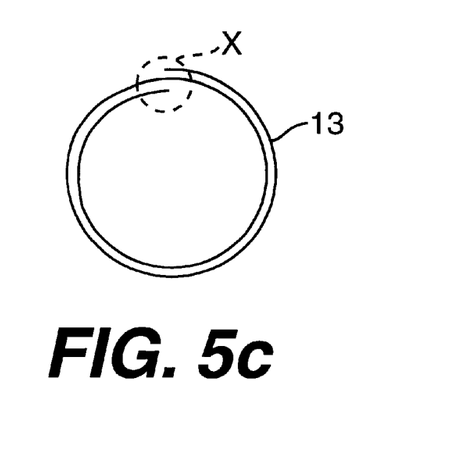
Figure 5D:
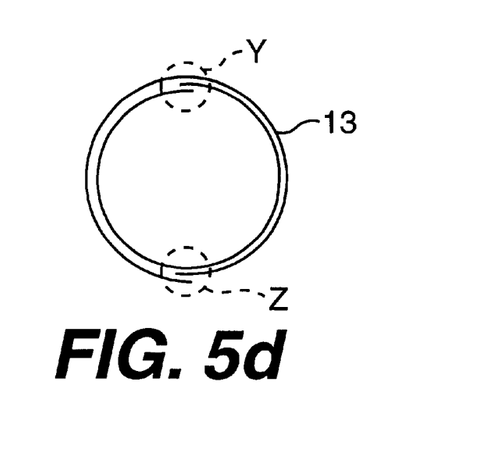

Further, regarding the method of splicing, the tire shown in FIG. 5c is an example where the polymer film 13 covers the inner surface of the tire continuously by at least two turns in the circumferential direction of the tire and there is a single splice portion X. Further, the tire shown in FIG. 5d (side view) is an example where two polymer films 13 are arranged so that the splice portion Y and splice portion Z do not coincide at the same location on the tire circumference. Note that the two or more polymer films may be the same material or different. Further, the polymer film may be adhered or bonded after molding in accordance with a conventional method or may be coated in accordance with a conventional method. Further, the plurality of films do not have to be adjacent unless at the outermost layer. For example, there is no problem if there is a carcass layer etc. between them.

Figure 6A:
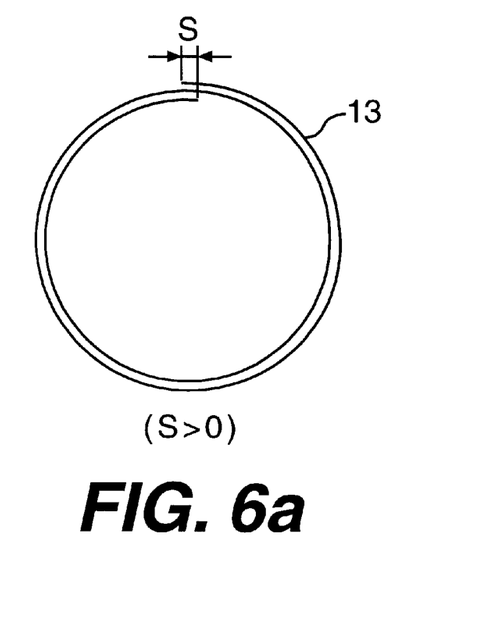
FIGS. 6a and 6b are views explaining the requirement of uniformity of a polymer film for an air permeation preventive layer according to the present invention.
Figure 6B:
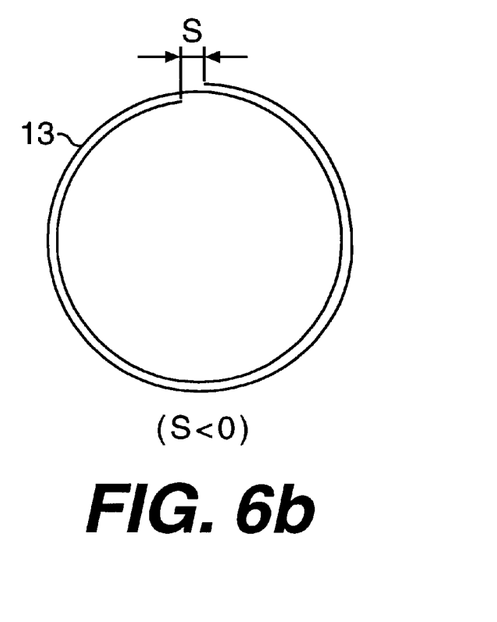

Further, according to the present invention, it is preferable that the amount of step S (mm) of the splice portion shown in FIGS. 6a and 6b and the circumferential length L (mm) at the crown center portion be:

$-0.05 \leq S/L \leq 0.05$

Outside this range, there is a tendency for the uniformity to deteriorate. Note that in the case of FIG. (6-a), S is made larger than 0, while in the case of FIG. (6-b), S is made smaller than 0.

Figure 7:
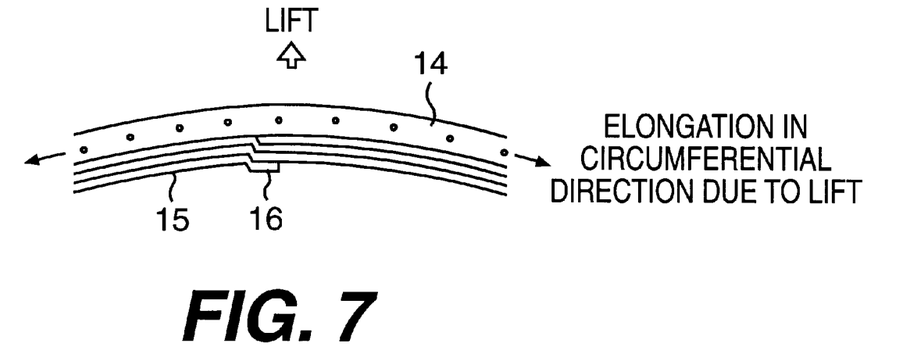
FIG. 7 is a view explaining why the problem of splice opening does not occur in the air permeation preventive layer according to the present invention.
Figure 8:
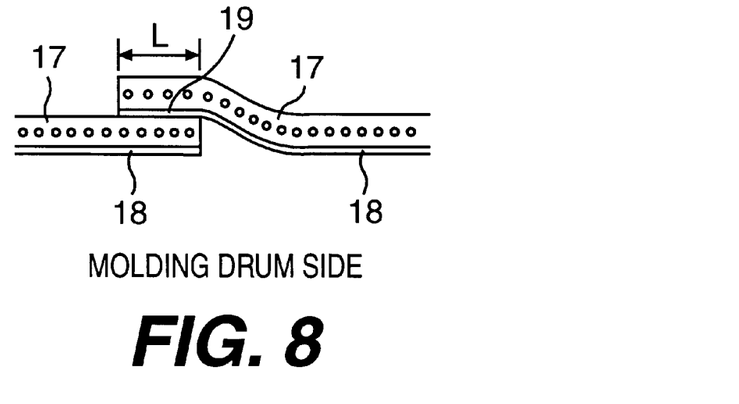
FIG. 8 is a conceptual sectional view of a structure of a splice portion obtained by use of a film having a low air permeability compared with butyl rubber to laminate the air permeation preventive layer and carcass in advance and simultaneously splice the same.

Further, according to the present invention, as shown in FIG. 7, a number of layers of polymer film 15 arranged at the inside of the carcass layer 14 are provided, and therefore, the stress will not concentrate at just the splice portion 16 even if lift is caused at the time of the second molding process, and therefore, no peeling (splice opening) of the splice portion 16 will occur even if there is elongation in the direction due to lift.

According to the third aspect of the present invention, there is provided a pneumatic tire of a single-ply carcass construction using, as an air permeation preventive layer, a film of a thermoplastic elastomer composition comprised of a thermoplastic resin or a blend of a thermoplastic resin component and elastomer component having an air permeation coefficient of not more than $25 \times 10^{-12}$ cc·cm/cm$^2$·sec·cmHg, concentrating the splice portions of the carcass layer and air permeation preventive layer at substantially one location on the circumference during the molding, and making the amount of splice between the carcass and air permeation preventive layer 5 to 60 mm.

In the pneumatic tire of the single-ply carcass construction according to the third aspect of the present invention, for example, as shown in FIGS. 8 to 11, the carcass 17 and a film of a thermoplastic elastomer composition comprised of a thermoplastic resin or a blend thereof with an elastomer are used in a pre-adhered state and the amount of overlap of the splice portion 19 at the time of molding is made 5 to 60 mm, preferably 10 to 50 mm. In this manner, according to the present invention, since the step difference at the splice portion 19 is small, it is possible to increase the amount of splice as explained above, whereby it becomes possible to obtain a sufficient splice strength without causing a deterioration of the uniformity.

In a second embodiment of the third aspect of the present invention, the overlap portion of the splice is coated with a tackifier to increase the bond strength of the splice portion and reduce the amount of splice from the case of no coating of a tackifier and enable the amount of overlap of the splice to be made 3 to 60 mm, preferably 3 to 50 mm. Note that the tackifier coated on the splice portion is not particularly limited. Any tackifier conventionally used in the past may be used by dissolving it in a solvent and coating it to a thickness of for example 1 μm to 100 μm. More specifically, for example, (a) a rosin resin (gum rosin, tall oil rosin, wood rosin, and other rosins: hydrated rosin, unhomogenized rosin, polymerized rosin, maleate rosin, and other basic rosins;) rosin glycerine ester (ester gum), hydrated rosinglycerine ester, and other rosin esters; and (b) terpene phenol resins and other resins having polar groups, resins not having polar groups, for example, α-pinene-based, β-pinene-based, dipentene-based (limonen), and other terpene resins; and aromatic hydrocarbon modified terpenes and other natural substances and their derivatives and for example (c) aliphatic, alicyclic, aromatic, and other petroleum resins; (d) cumarin-indene resins; (e) styrene type, substituted styrene type, and other styrene type resins and other polymer type resins or for example (f) alkylphenol resins, rosin-modified phenol resins, and other phenol type resins; and (g) xylene resins and other condensed resins. These may be used dissolved or suspended in a solvent in accordance with need. As such a solvent, use may be made of a general solvent. As specific examples, mention may be made of aromatic solvents (benzene, toluene, xylene, etc.), aromatic and aliphatic mixtures (M.S.P., S.B.P., Swazol 100, Swazol 200, Benzolallo 40, H.A.W.S., White Spirit, etc.), aliphatic esters (rubber volatile oil, ethyl acetate, etc.), alcohol ketone (methanol, acetone, methylethylketone, methylisobutylketone), etc. may be exemplified. It is possible to select the specific solvent among these solvents depending upon the rate of evaporation. These solvents may be used as mixtures of two or more types. The amount of the solvent added should be determined depending upon the viscosity of the tackifier. The viscosity is 10 cps to 1000 cps, preferably 50 to 500 cps. Further, the above resin and thermoplastic resin or thermoplastic elastomer composition may be mixed and used for the overlap portion in the state generally called a "hot melt". The thickness at this time is 1 μm to 100 μm. Further, a polyester polyol/isocyanate type tackifier or acrylic acid ester copolymer/organic peroxide type tackifier may be suitably used. For example, as the polyester polyol/isocyanate type tackifier used in the present invention, the following may be exemplified.

That is, as the polyester polyol, there are for example a condensed polyester polyol, lactone-type polyester polyol, polycarbonate diol, etc., but in general a condensed polyester polyol is often used. More specifically, there are ones obtained by a dehydrogenation condensation reaction of adipic acid and glycol and triol such as ethylene adipate, butylene adipate, diethylene adipate, etc. The molecular weight is preferably 3000 or more. If the molecular weight is less than 3000, there is a tendency for the tackiness to be insufficient. A polyester polyol is selected giving a critical surface tension difference $\gamma_c$ between the rubber component and film component of the tire of not more than 3.

Examples of the isocyanate component usable as the cross-linking agent are those which are cross-linked by the heat at the time of vulcanization of the tire. Specifical examples are TDI, MDI, crude MDI, NDI, HDI, IPDI, etc. The ratio of mixture of the polyester polyol and the isocyanate is preferably in the range of an index, (—NCO/—OH×100=) of 50 to 200. Outside of this range, there is poor tackiness, the bondability declines, and the tire members and thermoplastic film are no longer joined.

Catalysts, antioxidants, coloring agents, etc. generally used for urethane may also be suitably mixed in. Further, the above-mentioned tackifiers and solvents may also be used.

Examples of the acrylic acid ester copolymer/organic peroxide tackifier used in the present invention are, for example, of an acrylic acid ester copolymer (for example, polymers obtained by polymerizing butyl acrylate, 2-ethylhexyl acrylate, ethyl acrylate, and other monomers and copolymers with ethylene etc.) These are generally used as tackifiers before cross-linking by the organic peroxide. The polymer has a Tg of 40° C. or less, has tackiness, and typically is represented by the following general formula:

wherein, $R^1$ and $R^2$ are substituent groups selected from $C_{12}$ or less alkyl groups, arakyl groups, and aryl groups, $R^3$ is hydrogen or a $C_5$ or less alkyl group, n and m are integers of 1 or more, and p is 0 or an integer of 1 or more. Examples of the cross-linking agent of the acrylic acid ester copolymer are a general organic peroxide. For example, mention may be made of benzoyl peroxide, t-butylhydroperoxide, 2,4-dichloro dibenzoyl peroxide, 2,5-dimethyl-2,4 di(t-butyl peroxide)hexane, 2,5-dimethyl hexane-2,5-di (peroxybenzoate), etc. in an amount of 1 to 15 parts by weight per 100 parts of the acrylic acid ester copolymer.

Figure 9:
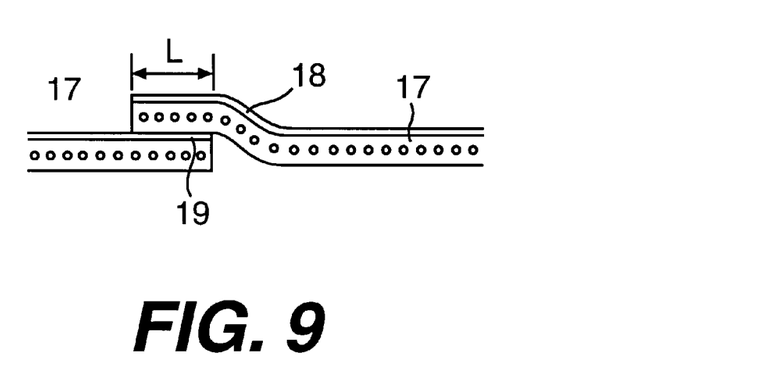
FIG. 9 is a conceptual sectional view of the structure of a splice portion according to a first embodiment of a third aspect of the present invention.
Figure 10:
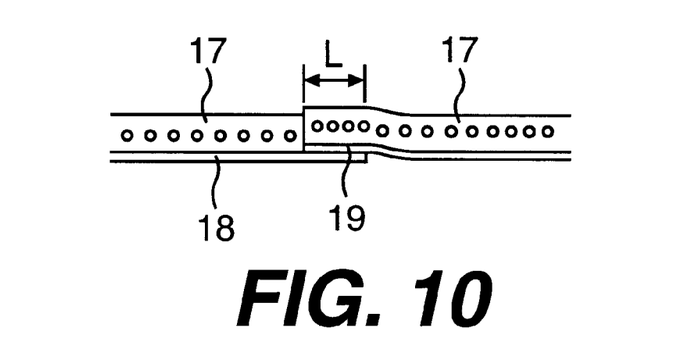
FIG. 10 is a conceptual sectional view of the structure of a splice portion according to a second embodiment of the third aspect of the present invention.
Figure 11:
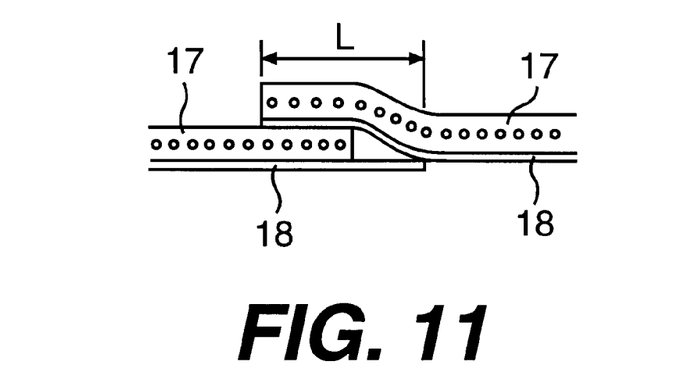
FIG. 11 is a conceptual sectional view of the structure of a splice portion according to a third embodiment of the third aspect of the present invention.

In addition, the above coloring agents, antioxidants, tackifiers, solvents, etc. may be mixed in. The air permeation preventive layer 18 for preventing air leakage may be arranged at the outside of the carcass layer 17 as shown in FIG. 9. Further, it may be arranged at the inside of the carcass layer as shown in FIGS. 10 and 11.

The pneumatic tire according to the third aspect of the present invention may be produced by conventional methods except for using the above-mentioned specific film as the air permeation preventive layer, the splice portions of the carcass and air permeation preventive layer is concentrated at a single location, and the amount of the splice is made 5 to 60 mm.

The pneumatic tire according to the fourth aspect of the present invention can give a pneumatic tire having a good uniformity since it uses, as an air permeation preventive layer, the above specific film, wraps the air permeation preventive layer at least once around the drum for molding the green tire and joins it, then wraps a carcass layer on the circumference of the tire from a position 5 to 50 cm away so that the stress will not easily concentrate at the splice of the air permeation preventive layer, the splice portion will not open, and portions of a high rigidity will not concentrate at the circumferential direction. At this time, the material may be fed after preadhering the air permeation preventive layer and the carcass layer offset in the direction of wrapping on the molding drum. Further, the above-mentioned tackifier may be coated at the splice portions of the air permeation preventive layers or on the entire surface.

EXAMPLES

The present invention will now be explained in further detail by Examples and Comparative Examples, but of course the scope of the present invention is not limited to these Examples.

Example I-1

A three-layer film comprised of two polypropylene resin layers (thickness of 0.02 mm each) between which is laminated a polyvinylidene chloride resin layer (thickness of 0.05 mm) was processed into a cylindrical film of a diameter of 345 mm and a thickness of 0.09 mm by a multilayer inflation device having two general 40 mm$\phi$ resin extruders and then wound up. A 360 mm length was cut out from the wound up cylindrical film and fit over the tire molding drum. On the cylindrical film were laid the carcass, sides, belt, tread, and other tire members. This assembly was then inflated to fabricate a green tire.

Here, as the polyvinylidene chloride, Dow Chemical F-313 was used and as the polypropylene resin Tokuyama PER R110E was used.

Next, the green tire was vulcanized at 185° C. for 15 minutes at a pressure of 2.3 MPa to finish a tire of the tire size 165SR13.

The time for setting the cylindrical film on the molding drum at the time of formation of the green tire, the uniformity of the produced pneumatic tire, and the air leakage of the resultant tires were measured. The results are shown in Table I-1.

Test Method for Uniformity

The uniformity was represented by the RFV value according to JASO C607-87 "Test Method of Uniformity of Automobile Tires".

Test Method for Tire Air Leakage

A 165SR13 steel radial tire (rim: 13×41/2-J) was used and allowed to stand for three months under conditions of an initial pressure of 200 kPa, no load, and a room temperature of 21° C. The pressure was measured every 4 days.

The value $\alpha$ was found by regression to the following formula:

$$P_t/P_o = \exp(-\alpha t)$$

where $P_t$ is the measurement pressure, $P_o$ is the initial pressure, and t is the number of elapsed days. The obtained value $\alpha$ is used and t=30 (days) inserted to obtain:

$$\beta = [1-\exp(-\alpha t)] \times 100$$

The value $\beta$ is made the rate of pressure loss (%/month) per month.

Comparative Example I-1

The same three-layer film as that prepared in Example I-1 cut out to a strip of a width of 360 mm and a thickness of 0.09 mm was wrapped around the tire molding drum. The splice portions were bonded by a usually used phenol resin adhesive, then a tire was fabricated in the same way as in Example I-1. The resultant tire was subjected to the same tests as Example I-1. Further, the liner wrapping process time was the time for wrapping the strip-like film, joining the splice portion by an adhesive, and setting the result over the molding drum at the time of forming the green tire. The results are shown in Table I-1.

TABLE I-1

| | Shape of liner | Liner wrapping process time*1 | Uniformity*2 | Tire air leakage |
|---|---|---|---|---|
| Ex. I-1 | Cylindrical, no splice | 70 | 93 | 100 |
| Comp. Ex. I-1 | Strip-like film joined, splice | 100 | 100 | 100 |

*1: Processing time when using processing time of Comparative Example I-1 100 (index).
*2: Average RFV value of n = 20 expressed as index.

Examples I-2 and I-3

The formulations shown in Table I-2, that is, the rubber material and the cross-linking compounding agent required for the dynamic cross-linking, were mixed by a biaxial kneader/extruder and extruded into strands. These were cooled, then pelletized by a resin pelletizer, then melt-extruded/inflation molded using a usual 40 mm monoaxial resin extruder to fabricate cylindrical films.

Note that the resin material was a cross-linked thermoplastic resin material with a resin layer as a matrix and a rubber layer as a domain (dispersed layer).

Next, tires were fabricated in the same way as in Example I-1 and used for the tests. The results are shown in Table I-3.

TABLE I-2

| | Ex. I-2 | Ex. I-3 |
|---|---|---|
| N6*1 | 50 | |
| MXD6*2 | | 50 |
| Br-IPMS*3 | 50 | 50 |
| GPF*4 | 30 | 30 |
| Paraffinic process oil | 10 | 10 |
| Zinc white | 0.25 | 0.25 |
| Stearic acid | 1 | 1 |
| Zinc stearate | 0.5 | 0.5 |

*1: Amilan CM1041, made by Toray.

TABLE I-3

| | Shape of liner | Liner wrapping process time*1 | Uniformity*2 | Action preventing air permeation*3 |
|---|---|---|---|---|
| Ex. I-2 | Cylindrical, no splice | 70 | 90 | 100 |
| Ex. I-3 | Cylindrical, no splice | 71 | 90 | 100 |
| Comp. Ex. I-1 | Strips joined, splice | 100 | 100 | 100 |

*1: Processing time when using processing time of Comparative Example I-1 100 (index).
*2: Average RFV value of n = 20 expressed as index.
*3: Shows measured value of air pressure measured by tire air leakage performance test.

Examples II-1 to II-9 and Comparative Examples II-1 to II-5

As shown in Table II-1, polymer films comprised of the materials A to D were used to fabricate tires having the air permeation preventive layers of the configurations shown in Table I (size: 165SR13, rim size: 13×41/2-J). These tires and the Standard Examples II-1 and II-2 were tested as follows:

The results are shown in Table II-1.

Test Method for Air Deposit

Vulcanized tires were cut. Those where problems with air deposits were observed were ranked as "defective" (x) and those where they were not observed were ranked as "good" (○).

Test Method for Moldability

Tires where the materials ended up elongating at the time of molding were ranked as "defective" (x) and those where they did not elongate were ranked as "good" (○).

Test Method for Splice Opening

Vulcanized tires with splice portions of the air permeation preventive layer opened up were ranked as "defective" (x) and those where they did not open up were ranked as "good" (○).

Test Method for Uniformity

The RFV was measured in accordance with JASO C-607-87 (Test Method of Uniformity of Automobile Tires). The results were indicated indexed to the inverse of the measured value of Standard Example II-2, a typical conventional tire, as 100 (the larger the figure, the better).

Test Method for Air Leakage (Rate of Pressure Loss) As explained above.

TABLE II-1

|  | Standard Ex. II-1 | Standard Ex. II-2 | Ex. II-1 | Ex. II-2 | Ex. II-3 | Ex. II-4 | Ex. II-5 | Ex. II-6 | Ex. II-7 | Ex. II-8 | Ex. II-9 |
| --- | --- | --- | --- | --- | --- | --- | --- | --- | --- | --- | --- |
| Material | A | D | A | B | C | A | A | A | A | A | A |
| Method of splicing air permeation preventive layer | 1 layer | 1 layer | 2 layers B-1 | 2 layers B-1 | 2 layers B-1 | 3 layers B-1 | 2 layers B-1 | 6 layers B-1 | 2 layers B-1 | 2 layers B-1 | 2 layers B-2 |
| Gauge t per layer of air permeation preventive layer (mm) | 0.02 | 0.5 | 0.02 | 0.02 | 0.02 | 0.02 | 0.2 | 0.2 | 0.02 | 0.02 | 0.02 |
| Total gauge t of air permeation preventive layer (mm) | 0.02 | 0.5 | 0.04 | 0.04 | 0.04 | 0.06 | 0.4 | 1.2 | 0.04 | 0.04 | 0.04 |
| Splite emount S/circumferential length L | +0.003 | +0.002 | +0.003 | +0.003 | +0.003 | +0.003 | +0.003 | +0.003 | −0.05 | +0.05 | +0.003 (both locations) |
| Air deposit | ○ | ○ | ○ | ○ | ○ | ○ | ○ | ○ | ○ | ○ | ○ |
| Moldability | ○ | ○ | ○ | ○ | ○ | ○ | ○ | ○ | ○ | ○ | ○ |
| Splice opening | x | ○ | ○ | ○ | ○ | ○ | ○ | ○ | ○ | ○ | ○ |
| Uniformity (index) | 103 | 100 | 112 | 112 | 111 | 120 | 111 | 125 | 104 | 106 | 112 |
| Rate of pressure loss (%/month) | 3 | 2.7 | 1.8 | 0.8 | 0.6 | 1.3 | 0.2 | 0.1 | 1.8 | 1.8 | 1.8 |
| Tire mass (kg) | 6.36 | 7.0 | 6.38 | 6.38 | 6.38 | 6.39 | 6.57 | 7.0 | 6.38 | 6.38 | 6.38 |
| Remarks | 1 air permeation prevention layer | Tie rubber gauge 0.7 mm | | | | | | | | | |

|  | Standard Ex. II-1 | Standard Ex. II-2 | Comp. Ex. II-1 | Comp. Ex. II-2 | Comp. Ex. II-3 | Comp. Ex. II-4 | Comp. Ex. II-5 |
| --- | --- | --- | --- | --- | --- | --- | --- |
| Material | A | D | A | A | A | A | A |
| Method of splicing air permeation preventive layer | 1 layer | 1 layer | 2 layers B-1 | 2 layers B-1 | 7 layers B-1 | 2 layers B-1 | 2 layers B-1 |
| Gauge t per layer of air permeation preventive layer (mm) | 0.02 | 0.5 | 0.01 | 0.3 | 0.2 | 0.02 | 0.02 |
| Total gauge t of air permeation preventive layer (mm) | 0.02 | 0.5 | 0.02 | 0.6 | 1.4 | 0.04 | 0.04 |
| Splice amount S/circumferential length L | +0.003 | +0.002 | +0.003 | +0.003 | +0.003 | −0.1 | +0.1 |
| Air deposit | ○ | ○ | ○ | x | ○ | ○ | ○ |
| Moldability | ○ | ○ | ○ | x | ○ | ○ | ○ |
| Splice opening | x | ○ | ○ | ○ | ○ | ○ | ○ |
| Uniformity (index) | 103 | 100 | 116 | 110 | 125 | 83 | 78 |
| Rate of pressure loss (%/month) | 3 | 2.7 | 3 | 0.1 | 0.06 | 1.8 | 1.8 |
| Tire mass (kg) | 6.36 | 7.0 | 6.36 | 6.68 | 7.11 | 6.38 | 6.38 |
| Remarks | 1 air permeation preventive layer | Tie rubber gauge 0.7 mm | Thin gauge per layer | Thick gauge per layer | Thick total gauge | S/L small | S/L large |

Footnote of Table I (All Parts are Parts by Weight)

Material A: Material comprised of 28 parts of nylon 6 (N6) (CM4061 made by Toray), 42 parts of nylon MXD6 (MXD6) (Reny 6002 made by Mitsubishi Gas Chemical), 30 parts of maleic acid-modified ethylene-propylene rubber (M-EPM), and 0.18 part of methylene dianiline having an air permeation coefficient of $2.13 \times 10^{-12}$ cc·cm/cm$^2$·sec·cmHg and a Young's modulus of 257 MPa.

Material B: Material comprised of 25.2 parts of nylon 6 (N6), 37.8 parts of MXD6, 48.9 parts of Master Batch A (100 parts of butyl rubber bromide: Exxon Bromobutyl 2244 made by Exxon Chemical, 60 parts of carbon black GPF: Sheast V made by Tokai Carbon, 1 part of stearic acid, 10 parts of petroleum hydrocarbon resin: Escolet 1102 made by Esso, and 10 parts of paraffin process oil), 10 parts of Hizex Million 240M (UHMWPE) made by Mitsui Petrochemical, 1.5 part of zinc white, 0.5 part of DM, and 0.3 part of sulfur having an air permeation coefficient of $0.84 \times 10^{-12}$ cc·cm/cm$^2$·sec·cmHg and a Young's modulus of 244 MPa.

Material C: Material comprised of 25.2 parts of N6, 37.8 parts of MXD6, 27.0 parts of Br-(polyisobutylene-p-methylstyrene) (EXXPRO 89-4 made by Exxon Chemical), and 10 parts of nylon 6/nylon 66/nylon 610 (CM4001 made by Toray) having an air permeation coefficient of $0.63 \times 10^{-12}$ cc·cm/cm$^2$·sec·cmHg and a Young's modulus of 317 MPa.

Material D: Butyl rubber (air permeation coefficient of $55 \times 10^{-12}$ cc·cm/cm$^2$·sec·cmHg and a Young's modulus of 15 MPa)

Standard Example III-1, Examples III-1 to III-7, and Comparative Examples III-1 to III-5

As shown in Table III-1, the compositions, thicknesses, amount of splice overlap, and splice structure of the air permeation preventive layer were changed in various ways and tested (tire size: 165SR13). Note that the test methods were as follows:

Amount of Splice Overlap of Carcass and Inner Liner

The amount of overlap of the splice was the amount of overlap L at the time of molding of the carcass.

Test Method for Air Deposits

As explained above.

Splice Opening Due to Lift at Time of Molding

Vulcanized tires with splice portions of the air permeation preventive layer opening due to the lift at the time of molding were ranked as "defective" (x) and those not opening as "good" (o).

Test Method for Uniformity

The RFV was measured in accordance with JASO C-607-87 (Test Method of Uniformity of Automobile Tires) (n=10). The results were indicated indexed to the measured value of Standard Example III-1, a conventional tire, as 100. The larger the value, the better the uniformity.

Test Method for Air Leakage (Rate of Pressure Loss)

As explained above.

Productivity

The minimum necessary number of rotations of the molding drum at the time of the first green molding of the carcass and inner liner (and tie rubber):

o: Can be molded by one turn of the molding drum x: Requires at least 2 turns of the molding drum Air Permeation Preventive Materials Used in Table III-1

(1) Production of Polybutylene Terephthalate 1,4 butane diol and dimethyl terephthalate were mixed at a ratio by weight of 2/3 and reacted at 180° C. At that time, as the catalyst, use was made of tetraoctyl titanate. The reaction was stopped at the time when a stoichiometric amount of methanol was produced from this reaction and the result used as the polybutylene terephthalate.

(2) Production of Polypropylene Diimidosic Acid

Polypropylene amine and anhydrous trimellitic acid were reacted at ordinary temperature for 1.5 hours, then further reacted at 100° C. for 3 hours under reduced pressure to prepare polypropylene diimido diacid.

(3) Preparation of Thermoplastic Polyester Elastomer (Material E)

45 wt % of the above polybutylene terephthalate and 55 wt % of polypropylene diimido diacid were mixed and reacted at 250° C. to prepare a thermoplastic polyester elastomer.

The thermoplastic polyester elastomer prepared by the above method was pelletized by a pelletizer, then some of the additives in Table III-2 were mixed in. This was extruded into a film using a resin extruder to produce a film of a width of 350 mm and thickness of 0.1 mm. The air permeation coefficient was $24.0 \times 10^{-12}$ cc·cm/cm$^2$·sec·cmHg and the Young's modulus was 180 MPa.

Material F-1: A material comprised of a thermoplastic resin component of 28 parts of nylon 6 (N6) (CM4061 made by Toray) and 42 parts of nylon MXD6 (MXD6) (Reny 6002 made by Mitsubishi Gas Chemical) and an elastomer component of 30 parts of maleic acid modified ethylene propylene rubber (M-EPM) and 0.18 part of methylene dianiline having an air permeation coefficient of $2.13 \times 10^{-12}$ cc·cm/cm$^2$·sec·cmHg and a Young's modulus of 257 MPa.

Material F-2: A material comprised of a thermoplastic resin component of 25.2 parts of N6 and 37.8 parts of MXD6, an elastomer component of 48.9 parts of a master batch (100 parts of butyl rubber bromide: Exxon Bromobutyl 2244 made by Exxon Chemical, 60 parts of carbon black GPF: Sheast V made by Tokai Carbon, 1 part of stearic acid, 10 parts of petroleum hydrocarbon resin: Escolet 1102 made by Esso, and 10 parts of paraffin process oil), a compatibility component of 10 parts of Hizex Million 240M (EEA) made by Mitsui Petrochemical, and a dynamic vulcanization system of 1.5 part of zinc white, 0.5 part of DM, and 0.3 part of sulfur having an air permeation coefficient of $0.84 \times 10^{-12}$ cc·cm/cm$^2$·sec·cmHg and a Young's modulus of 244 MPa.

Material F-3: A material comprised of a thermoplastic resin component of 25.2 parts of N6, 37.8 parts of MXD6 and 10 parts of nylon 6/nylon 66/nylon 610 (CM4001 made by Toray) and an elastomer component of 27.0 parts of Br-(polyisobutylene-p-methylstyrene) (EXXPRO 89-4 made by Exxon Chemical) having an air permeation coefficient of $0.63 \times 10^{-12}$ cc·cm/cm$^2$·sec·cmHg and a Young's modulus of 317 MPa.

Butyl rubber: Br-IIR rubber composition (air permeation coefficient of $55 \times 10^{-12}$ cc·cm/cm²·sec·cmHg and Young's modulus of 15 MPa)

Tackifier Used for Table III-1

|  | Composition |
|---|---|
| EEA: ethylene ethyl acrylate copolymer DPDJ-6169 (Nihon Unika) | 100 |
| Ouiton A-100 (Nihon Zeon) | 60 |
| Dicumyl peroxide | 1 |
| FEF-black | 10 |
| Toluene | 400 |
| MEK | 100 |
| n-hexane | 100 |

In the above formulation, a kneader was used to mix the EEA, Quinton A-100, and FEF black. The result was then stirred by a homogenizer (8000 rpm) in a mixed solution of the toluene and subsequent components to make the tackifier. Finally, the dicumyl peroxide was added and the result stirred.

TABLE III-1

|  | Standard Ex. III-1 | Comp. Ex. III-1 | Comp. Ex. III-2* | Comp. Ex. III-3 | Comp. Ex. III-4 | Comp. Ex. III-5 |
|---|---|---|---|---|---|---|
| Air permeation preventive material*¹ | Butyl rubber | Butyl rubber | Butyl rubber | Butyl rubber | B-1 | B-1 |
| Air permeation coefficient × 10⁻¹² (cc · cm/cm² · sec · cmHg) | 55 | 55 | 55 | 55 | 2.13 | 2.13 |
| Air permeation preventive layer gauge (mm) | 0.50 | 0.50 | 0.50 | 0.10 | 0.10 | 0.10 |
| Tie rubber gauge (mm) | 0.70 | 0.70 | none | none | none | none |
| Amount of overlap of molded splice of carcass and air permeation preventive layer (mm) | 3 (carcass) 3 (liner) | 3 | 3 | 3 | 3 | 65 |
| Coating of tackifier | none | none | none | none | none | none |
| Structure of carcass splice | FIG. 3 | FIG. 2 | FIG. 8 | FIG. 8 | FIG. 8 | FIG. 8 |
| Rate of loss of air pressure (%/month) | 2.7 | 2.7 | 2.7 | 6.1 | Unevaluatable | 0.7 |
| Unifomity (index) | 100 | 97 | 107 | 110 |  | 98 |
| Rolling resistance (index) | 100 | 100 | 94 | 97 |  | 101 |
| Trouble due to air deposit of splice | ○ | x | ○ | ○ |  | ○ |
| Opening of splice due to lift at time of molding | ○ | ○ | ○ | ○ | x | ○ |
| Productivity | x | ○ | ○ | ○ | ○ | ○ |
| Weight (kg) | 7.0 | 7.0 | 6.6 | 6.4 | 6.4 | 6.4 |
| Remarks | — | — | With tie rubber is removed, rolling resistance increases | When butyl rubber is made thinner, air easily leaks | — | — |

|  | Standard Ex. III-1 | Ex. III-1 | Ex. III-2 | Ex. III-3 | Ex. III-4 | Ex. III-5 | Ex. III-6 | Ex. III-7 | Ex. III-8 |
|---|---|---|---|---|---|---|---|---|---|
| Air permeation preventive material*¹ | Butyl rubber | E | F-1 | F-1 | F-1 | F-1 | F-1 | F-2 | F-3 |
| Air permeation coefficient × 10⁻¹² (cc · cm/cm² · sec · cmHg) | 55 | 24.0 | 2.13 | 2.13 | 2.13 | 2.13 | 2.13 | 0.84 | 0.63 |
| Air permeation preventive layer gauge (mm) | 0.50 | 0.3 | 0.10 | 0.10 | 0.10 | 0.10 | 0.10 | 0.05 | 0.05 |
| Tie rubber gauge (mm) | 0.70 | none | none | none | none | none | none | none | none |
| Amount of overlap of molded splice of carcass and air permeation preventive layer (mm) | 3 (carcass) 3 (liner) | 10 | 5 | 10 | 50 | 60 | 3 | 10 | 10 |
| Coating of tackifier | none | none | none | none | none | none | yes | none | none |
| Structure of carcass splice | FIG. 3 | FIG. 8 | FIG. 8 | FIG. 8 | FIG. 8 | FIG. 8 | FIG. 8 | FIG. 8 | FIG. 8 |
| Rate of loss of air pressure (%/montn) | 2.7 | 2.1 | 0.7 | 0.7 | 0.7 | 0.7 | 0.7 | 0.6 | 0.5 |
| Uniformity (index) | 100 | 110 | 109 | 109 | 101 | 100 | 111 | 112 | 111 |
| Rolling resistance (index) | 100 | 102 | 102 | 102 | 101 | 101 | 102 | 102 | 102 |
| Trouble due to air deposit of splice | ○ | ○ | ○ | ○ | ○ | ○ | ○ | ○ | ○ |
| Opening of splice due to lift at time of molding | ○ | ○ | ○ | ○ | ○ | ○ | ○ | ○ | ○ |
| Productivity | x | ○ | ○ | ○ | ○ | ○ | ○ | ○ | ○ |
| Weight (kg) | 7.0 | 6.5 | 6.4 | 6.4 | 6.4 | 6.4 | 6.4 | 6.3 | 6.3 |
| Remarks | — | — | — | — | — | — | If tackifier is used, amount of splice can be reduced. | — | — |

Example IV-1 (Tire size 165SR13)

Figure 12:
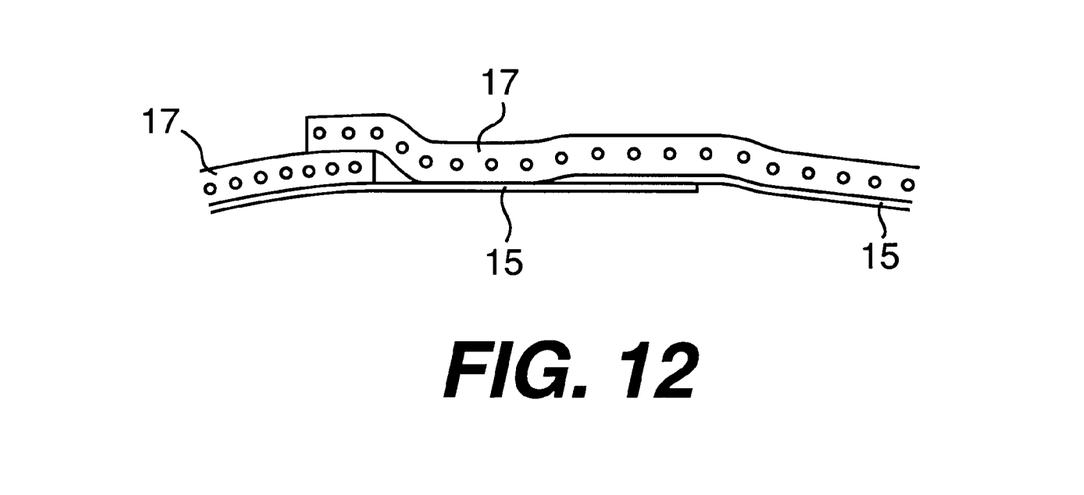
FIG. 12 is a conceptual sectional view of the structure of a splice portion according to an embodiment of a fourth aspect of the present invention.

Sheet-like air permeation preventive layers obtained by cutting a three-layer film such as shown in Example I-1 were wrapped on a drum for molding green tires, the sheets were joined, then the carcass material was wrapped from a position offset in the circumferential direction to obtain a pneumatic tire with a splice section as shown in FIG. 12.

At this time, the experiments were run on a tire with an amount of the carcass splice of 5 mm, an amount of the splice of the air permeation preventive layer of 50 mm, and a distance between the carcass splice and the film splice portion in the circumferential direction of 20 cm.

As a result, since there is no carcass layer interposed between the splices of the air permeation preventive layer and the air permeation preventive layers are directly joined, those portions will not open up. Further, the only portion where the thickness of the joint portion of the carcass layer and air permeation preventive layer is large is the carcass splice portion, and therefore, a tire is obtained with a better uniformity than the conventional case of use of butyl rubber for the air permeation preventive layer (where thick portions are at both the carcass splice and rubber liner splice).

INDUSTRIAL APPLICABILITY

As explained above, according to the first aspect of the present invention, it becomes possible to lighten the weight of the tire without detracting from the retention of air pressure in the tire and, by using as the air permeation preventive layer a cylindrical thermoplastic film, it becomes possible to improve the quality and reliability of the pneumatic tire (that is, since there is no join of the film of the air permeation preventive layer, the elongation at the time of inflation in the tire molding process is constant and therefore the uniformity of the air permeation preventive layer is improved and, also, there is no liability of the join of the film opening up and causing a defective tire at the time of inflation) and possible to improve the efficiency of production of the pneumatic tire (work of adhering film being complicated, while insertion of cylindrical material inside green tire being easy).

Further, according to the second aspect of the present invention, by using, as the air permeation preventive layer, a film of a preferable thickness of 0.02 to 0.2 mm of a polymer composition containing a thermoplastic resin or a blend of a thermoplastic resin and elastomer with an air permeation preventive layer of not more than $25 \times 10^{-12}$ cc·cm/cm$^2$·sec·cmHg and a Young's modulus of 1 to 500 MPa and providing a plurality of layers at the inner circumferential surface of the tire as a whole, the effects are achieved of 1) a major reduction of weight becoming possible due to the gauge being extremely thin, 2) the suppression of air deposits at step differences as in the past, and therefore, the elimination of a case of trouble in vulcanization due to the gauge being extremely thin, and 3) a lack of deterioration of the moldability despite the thin gauge due to the high modulus.

Further, according to the third aspect of the present invention, by using, as the air permeation preventive layer, a film of a polymer composition containing a thermoplastic elastomer composition comprised of a thermoplastic resin or a blend of a thermoplastic resin and elastomer having an air permeation preventive layer of not more than $25 \times 10^{-12}$ cc·cm/cm$^2$·sec·cmHg, molding the tire so that the splices of the carcass layer and air permeation preventive layer become substantially concentrated at a single location on the circumference, and the amount of the splice between the carcass and air permeation preventive layer is made 5 to 60 mm, it is possible to provide a lightweight pneumatic tire of a structure manufacturable with a good productivity without causing the deterioration of the rolling resistance, durability, etc.

Further, according to the fourth aspect of the present invention, by using, as an air permeation preventive film, a film of a polymer composition the same as that used in the above first to third aspects and arranging the splice portion of the layer at a position 5 to 50 cm away from the splice portion of the carcass layer on the circumference of the tire, it is possible to improve the uniformity compared with a conventional tire using a butyl rubber liner and prevent the splice portion of the air permeation preventive layer from opening up due to the lift at the time of vulcanization of the tire.

We claim:

1. A pneumatic tire having an air permeation preventive layer comprised of a cylindrical film or sheet heat-fused into a cylindrical shape and free from any connecting portion, said cylindrical film or sheet being composed of a polymer composition containing a thermoplastic resin or a blend of a thermoplastic resin and an elastomer component and having an air permeation coefficient of not more than $25 \times 10^{-12}$ cc·cm/cm$^2$·sec·cmHg and a Young's modulus of 1 to 500 MPa, wherein said film or sheet is arranged in such a manner that at least one turn of the film or sheet in the circumferential direction of the tire.

2. The pneumatic tire of claim 1, wherein the polymer composition of the cylindrical film or sheet is a blend of a thermoplastic resin and an elastomer component, said blend having (i), as a matrix, at least one thermoplastic resin selected from the group consisting of a polyamide resin, a polyester resin, a polynitrile resin, a polyvinyl resin, a cellulose resin, a fluororesin and an imide resin and (ii), as a discontinuous phase dispersed therein, the elastomer component.

3. The pneumatic tire of claim 1, wherein the polymer composition of the cylindrical film or sheet is at least one thermoplastic resin selected from the group consisting of a polyamide resin, a polyester resin, a polynitrile resin, a polyvinyl resin, a cellulose resin, a fluororesin and an imide resin.

4. The pneumatic tire of claim 1, wherein the air permeation preventive layer is a single layer of the cylindrical film or sheet and the polymer composition of the cylindrical film or sheet is (I) at least one thermoplastic resin selected from the group consisting of a polyamide resin, a polyester resin, a polynitrile resin, a polyvinyl resin, a cellulose resin, a fluororesin and an imide resin or (II) a blend of a thermoplastic resin and an elastomer component, said blend having (i), as a matrix, at least one thermoplastic resin selected from the group consisting of a polyamide resin, a polyester resin, a polynitrile resin, a polyvinyl resin, a cellulose resin, a fluororesin and an imide resin and (ii), as a discontinuous phase dispersed therein, the elastomer component.

5. The pneumatic tire of claim 1, wherein the air permeation preventive layer consists of multiple layers of the cylindrical film or sheet and the polymer composition of the cylindrical films or sheets is (I) at least one thermoplastic resin selected from the group consisting of a polyamide resin, a polyester resin, a polynitrile resin, a polyvinyl resin, a cellulose resin, a fluororesin and an imide resin or (II) a blend of a thermoplastic resin and an elastomer component, said blend having (i), as a matrix, at least one thermoplastic resin selected from the group consisting of a polyamide resin, a polyester resin, a polynitrile resin, a polyvinyl resin, a cellulose resin, a fluororesin and an imide resin and (ii), as a discontinuous phase dispersed therein, the elastomer component.

6. The pneumatic tire of claim 4 or 5, wherein the thickness of each layer is from 0.02 to 0.2 mm.

* * * * *

UNITED STATES PATENT AND TRADEMARK OFFICE
CERTIFICATE OF CORRECTION

PATENT NO. : 5,938,869
DATED : August 17, 1999
INVENTOR(S) : Hiroyuki KAIDO et al.

It is certified that error appears in the above-identified patent and that said Letters Patent is hereby corrected as shown below:

Claim 1, Col. 22, line 21-22, after "arranged", delete "in such a manner that at least one turn of the film or sheet".

Signed and Sealed this

Ninth Day of May, 2000

Q. TODD DICKINSON

Attest:

Attesting Officer

Director of Patents and Trademarks